(12) United States Patent
Yang et al.

(10) Patent No.: US 10,763,543 B2
(45) Date of Patent: Sep. 1, 2020

(54) RECHARGEABLE AQUEOUS HYBRID BATTERY

(71) Applicant: TOYOTA MOTOR ENGINEERING & MANUFACTURING NORTH AMERICA, INC., Plano, TX (US)

(72) Inventors: Ruidong Yang, Wilmington, DE (US); Kensuke Takechi, Nagoya (JP); Koji Suto, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 185 days.

(21) Appl. No.: 15/949,275

(22) Filed: Apr. 10, 2018

(65) Prior Publication Data
US 2019/0312303 A1    Oct. 10, 2019

(51) Int. Cl.
| | |
|---|---|
| *H01M 10/26* | (2006.01) |
| *H01M 10/0562* | (2010.01) |
| *H01M 4/485* | (2010.01) |
| *H01M 4/505* | (2010.01) |
| *H01M 4/24* | (2006.01) |
| *H01M 10/054* | (2010.01) |
| *H01M 10/0525* | (2010.01) |
| *H01M 4/133* | (2010.01) |

(52) U.S. Cl.
CPC ....... *H01M 10/0562* (2013.01); *H01M 4/133* (2013.01); *H01M 4/24* (2013.01); *H01M 4/485* (2013.01); *H01M 4/505* (2013.01); *H01M 10/054* (2013.01); *H01M 10/0525* (2013.01); *H01M 10/26* (2013.01); *H01M 2220/20* (2013.01); *H01M 2300/0014* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 9,276,292 | B1 | 3/2016 | MacKenzie et al. |
| 9,780,412 | B2 | 10/2017 | Adams et al. |
| 9,786,926 | B2 | 10/2017 | Lockett et al. |
| 2016/0254567 | A1 | 9/2016 | Cai et al. |
| 2017/0077503 | A1 | 3/2017 | Erickson et al. |
| 2017/0214089 | A1 | 7/2017 | Jimenez et al. |
| 2017/0250449 | A1 | 8/2017 | Adams et al. |

FOREIGN PATENT DOCUMENTS

| | | |
|---|---|---|
| CN | 105958131 A | 9/2016 |
| WO | WO 2017/105578 A2 | 6/2017 |

*Primary Examiner* — Tracy M Dove
(74) *Attorney, Agent, or Firm* — Oblon, McClelland, Maier & Neustadt, L.L.P.

(57) ABSTRACT

A zinc ion hybrid battery is provided. The battery contains an anode capable of intercalation and de-intercalation of zinc ions, a cathode having a 4V active material capable of intercalation and de-intercalation of zinc ions, lithium ions and both zinc and lithium ions; and an aqueous electrolyte which comprises: water, and a zinc salt of an anion comprising a fluoroalkylsulfonyl group of formula (I):

$$R\text{—}SO_2\text{-} \tag{I}$$

wherein R is a perfluoroalkyl group of 1-5 carbons.

14 Claims, 8 Drawing Sheets

RECHARGEABLE AQUEOUS HYBRID BATTERY

BACKGROUND

Lithium ion batteries have occupied a prominent position in conventional power sources due to the capability to provide high energy density and good cycling performance. However, conventional commercial grade lithium ion batteries have been subject to safety issues resulting from the use of flammable organic solvents as electrolyte components. Moreover, lithium is toxic and of high cost and ongoing research efforts in power source development have targeted batteries of improved safety and lower cost.

Further, the use of electricity generated from environmentally clean and renewable sources, such as water, wind, or sunlight requires high-power and high-energy secondary batteries to efficiently store and redistribute the electrical energy Ideally, such batteries will be constructed using abundant, low-cost materials according to sustainable processes. Conventional secondary (rechargeable) batteries include lithium, lithium ion (LIB), sodium ion, nickel cadmium (Ni—Cd), lead-acid, magnesium, calcium and aluminum batteries. Most of the current batteries, such as for example lithium ion batteries, utilize univalent ions (i.e. $H^+$, $Li^+$, $Na^+$ or $K^+$) as the medium to store energy.

However, multivalent ions are increasingly of interest for use in battery chemistry to establish a "next generation" of batteries to the lithium battery. Performance of selected multivalent ions in aqueous electrolyte media has the potential to meet and exceed the performance of lithium batteries with greater safety and lower cost. The need for such next generation of batteries is exacerbated because of the rapid development and commercialization of electrified vehicles such as electric vehicles (EV), plug-in hybrid vehicles (PHV) and hybrid vehicles (HV).

Multivalent ions, including $Ni^{2+}$, $Zn^{2+}$, $Mg^{2+}$, $Ca^{2+}$, $Ba^{2+}$, and $La^{3+}$ are under investigation for utility in the next generation battery. However, each of these ions may require specific combinations of anode composition and structure, cathode composition and structure and electrolyte composition. In general it has not been possible to simply substitute multivalent ions in present lithium ion battery systems to successfully derive new batteries of commercial utility.

Of the potential multivalent ions listed above. Zinc is a strong candidate due to an abundant supply, thus, low cost and environmental friendliness. The redox potential of $Zn/Zn^{2+}$ is −0.762 V vs. SHE (or 2.278 vs. $Li/Li^+$), and thus, zinc provides adequately low potential as an anode material when coupling with high voltage cathodes.

Moreover, since the current Li-ion secondary battery uses a flammable non-aqueous electrolyte, it is necessary in present vehicles to install external battery control circuits and internal safety components. Such systems incur added weight, bulk and cost to the vehicle. On the other hand, batteries using an aqueous (water-based) electrolyte, such as Ni–MH battery, are much safer because of the inflammable property of the electrolyte, however, the energy density of aqueous electrolyte batteries is quite low due to their low voltage profile (<1.6 V) caused by the limitation of the electrochemical stability of the aqueous electrolyte.

Zinc has a high theoretical capacity (820 mAhg−1) as anode. An adaptable negative potential (−0.762 V vs. SHE), enables zinc to be constructed with other cathodes in aqueous electrolytes. Several rechargeable zinc batteries, including nickel//zinc battery, zinc//air battery and $Zn//Na_{0.95}MnO_2$ and $Zn//LiMn_2O_4$ have been investigated in aqueous systems.

However, the selection of cathodes to combine with a zinc based anode may be constrained by the limitation of the cathode potential vs. $Zn^{2+}/Zn$. Too low cathode potential also reduces the power density of cathodes, while too high potential may destroy the aqueous electrolyte, due to decomposition of water. To be utilized as an aqueous cathode the cathode active material must have aqueous stability and adaptable charge/discharge potential plateaus compared with that of decomposition of water. Cathodic 4 V active materials such as $LiMn_2O_4$, $LiCoO_2$ or $LiN_{1/3}Co_{1/3}Mn_{1/3}O_2$ offer high performance opportunity, however their potential plateaus in aqueous media are close to the decomposition potential of water. Therefore, cathodes with potential plateaus below 4 V have been investigated in aqueous electrolyte batteries to date.

Such low V cathode materials studied include the olivine structured $LiFePO_4$ and NASICON-type $M_3V_2(PO_4)_3$ (M=Li, Na) which were paired with Zn metal as anode in the form of hybrid Zn—Li batteries. However, the achieved discharge voltage obtained is insufficient due to the limited potential of the cathodes.

Therefore, there is a need to identify materials and construction capable of utilizing zinc chemistry as the anode component in combination with an aqueous electrolyte to construct a secondary (rechargeable) battery of high discharge voltage, good cycle discharge stability and high safety performance.

SUMMARY OF THE EMBODIMENTS

These and other objects have been achieved by the embodiments described herein wherein the first embodiment includes a zinc ion hybrid battery, comprising: an anode capable of intercalation and de-intercalation of zinc ions; a cathode having a 4V active material capable of intercalation and de-intercalation of zinc ions, lithium ions and both zinc and lithium ions; and an aqueous electrolyte which comprises: water; and a zinc sail of an anion comprising a fluoroalkylsulfonyl group of formula (I):

R—SO2-        (I)

wherein R is a perfluoroalkyl group of 1-5 carbons.

In an aspect of the first embodiment the 4V cathode active material is compatible with aqueous electrolyte and has a redox potential of less than 5.5 V vs Li/Li+.

In a further aspect of the first embodiment the 4V cathode active material comprises at least one material selected from the group consisting of $LiMn_2O_4$, $LiCoO_2$, $LiFe_2(PO_4)$, $LiMn_{1/3}Ni_{1/3}Co_{1/3}O_2$, $LiNi_{0.5}Mn_{1.5}O_4$, $LiCoPO_4$, 2,2,6,6-tetra-methypiperdine 1-oxyl (TEMPO) and 4-methoxy-2,2,6,6-tetra-methypiperidine 1-oxyl (MeO-TEMPO).

In an aspect of the first embodiment the zinc salt of an anion comprising a fluoroalkylsulfonyl group of formula (I) is selected from the group consisting of Zinc (II) bis(trifluoromethylsulfonyl)imide ($Zn(TFSI)_2$), Zinc (II) bis(pentafluoroethylsulfonyl)imide ($Zn(BETI)_2$), Zinc (II) trifluoromethylsulfonate ($Zn(TFS)_2$), and Zinc (II) bis(fluoromethylsulfonyl)imide ($Zn(FSI)_2$).

In another aspect of the first embodiment a molar ratio of the zinc salt of an anion comprising a fluoroalkylsulfonyl group of formula (I) to water is from 1/10 to 50/1.

In a further aspect of the first embodiment, the battery is a single-compartment cell battery comprising one liquid electrolyte wherein no physical barrier separates the cathode electrolyte from the anode electrolyte.

In a further aspect of the first embodiment the zinc ion hybrid battery is a two-compartment cell battery, comprising: an anode compartment comprising an anolyte; a cathode compartment comprising a catholyte, and a solid electrolyte permeable to lithium ions, wherein the solid electrolyte prevents the crossover of the anolyte and the catholyte.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
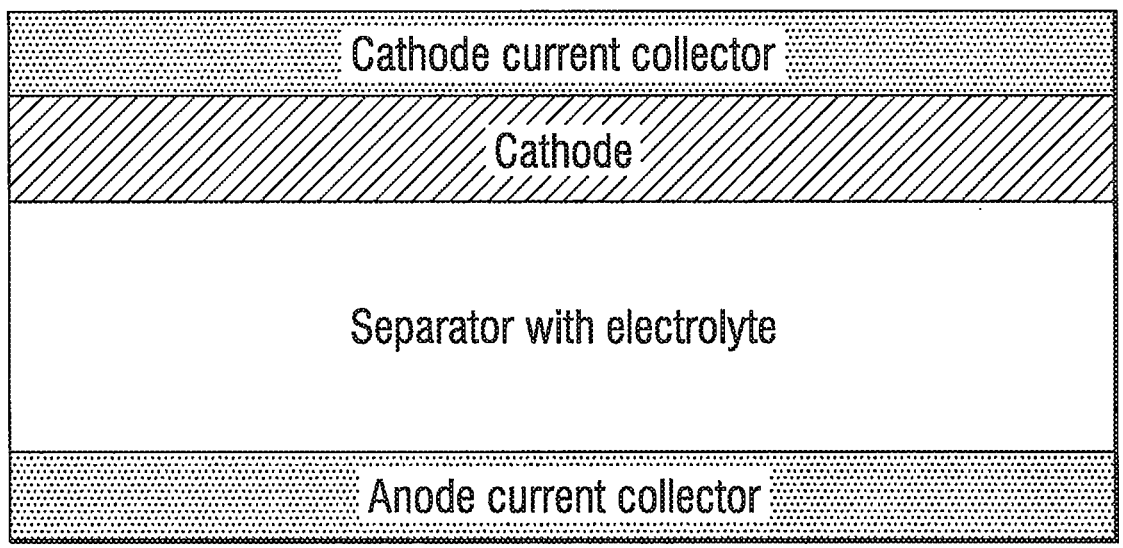
FIG. 1 shows a schematic diagram of a single-compartment cell battery configuration of a Zn—Li hybrid battery according to one aspect of the embodiment.

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the words "a" and "an" and the like carry the meaning of "one or more." The phrases "selected from the group consisting of," "chosen from," and the like include mixtures of the specified materials. Terms such as "contain(s)" and the like are open terms meaning "including at least" unless otherwise specifically noted. Where % composition description is provided the % values are % by weight unless specified otherwise. When used with a number value the term "about" includes a range of plus or minus ten percent of the value associated with the term "about." As used herein, the term "vehicle" refers to any power driven device designed for transportation including an automobile, truck van, bus, golf cart and other utility forms of transportation.

In ongoing investigation to further widen the electrochemical window and safety of lithium-ion batteries, the inventors have conducted extensive studies of aqueous electrolyte systems and methods to widen the electrochemical window thereof. In U.S. application Ser. No. 15/252,513, filed Aug. 31, 2016, the present inventors disclosed that the water component of an electrolyte system may be strongly stabilized in a composition containing a chemical component in addition to a concentrated salt. Explicitly, it was described that a highly stabilized electrolyte system tor a lithium-ion battery having a wide electrochemical window may be obtained by including a lithium salt of an anion having a fluoroalkylsulfonyl group and linear or cyclic ether in the aqueous composition.

In continuing studies of aqueous electrolyte systems as described in copending U.S. application Ser. No. 15/663,262, filed Jul. 28, 2017, the inventors further discovered that a lithium ion electrolyte system may be extensively stabilized and the electrochemical window broadened with an aqueous electrolyte comprising: water; a lithium salt of an anion comprising a fluoroalkylsulfonyl group of formula (I):

$$R—SO_2— \quad (I)$$

wherein R is a perfluoroalkyl group of 1-5 carbons; and an ionic liquid which is a salt of a protonic cation and an anion comprising a fluoroalkylsulfonyl group of formula (I) In further efforts to improve and extend the performance range of lithium secondary batteries the inventors have discovered that the above objectives are even more achieved with an aqueous electrolyte system based upon bis(fluorosulfonyl) imide (FSI) systems as described in copending U.S. application Ser. No. 15/831,781, filed Dec. 5, 2017.

As described above, multivalent ion batteries and especially batteries based on zinc redox chemistry are of great interest as a next generation battery and the inventors have studied the problems associated with preparing an aqueous secondary zinc hybrid battery having an electrochemical window of about 3 V.

To suppress the decomposition of water in lithium and sodium aqueous batteries, highly concentrated Li-salt (21 m) and Na-salt (9.26 m) aqueous electrolyte systems were used to stabilize the water by forming a complex between the salt and the water molecule. Since the window of the free-water (bulk water, regular water), which has clusters of water molecules, is different from the window of individual water molecules, the water molecules coordinated by highly concentrated salt ions can behave like the "individual water molecules" to have wider electrochemical window.

Noting the similarity in ionic diameter of the zinc ion (0.74 Å) to the lithium ion (0.69 Å), the inventors have studied hybrid zinc/lithium battery configurations with an aqueous electrolyte and have surprisingly discovered that aqueous zinc hybrid batteries having wide electrochemical windows may be obtained with electrolyte systems according to the present embodiments and a 4V cathode active material. To achieve high oxidative stability of the aqueous electrolytes and enable the use of high voltage cathodes for the Zn—Li hybrid batteries, the inventors have discovered that water may be stabilized by highly concentrated aqueous Zinc(II) fluoroalkylsulfonyl salts and thus, obtain electrolytes having oxidative stability sufficient to employ 4 V active cathode materials. Further surprisingly, the aqueous highly-concentrated Zn-salt electrolytes according to the embodiments described in this application are characterized by a fast Zn depositing rate in cyclic voltammetry testing. High charge/discharge rates are performed in the Zn—Li hybrid batteries employing the electrolytes, which indicate the potential to provide high power.

Thus in the first embodiment a zinc ion hybrid battery is provided. The zinc ion hybrid battery comprises: an anode capable of intercalation and de-intercalation of zinc ions; a cathode having a 4V active material capable of intercalation and de-intercalation of zinc ions, lithium ions and both zinc and lithium ions; and an aqueous electrolyte which comprises: water; and a zinc salt of an anion comprising a fluoroalkylsulfonyl group of formula (I):

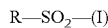

wherein R is a perfluoroalkyl group of 1-5 carbons.

The 4V cathode active material may be any material compatible with aqueous electrolyte and having a redox potential of less than 5.5 V vs Li/Li+. Examples of the 4V cathode active material include but may not be limited to, one or more materials selected from the group consisting of $LiMn_2O_4$, $LiCoO_2$, $LiFe_2(PO_4)$, $LiMn_{1/3}Ni_{1/3}Co_{1/3}O_2$, $LiNi_{0.5}Mn_{1.5}O_4$, $LiCoPO_4$, 2,2,6,6-tetra-methypipertdine 1-oxyl (TEMPO).

Porous forms of any these may be prepared and nanoparticle structure may be especially useful as active cathode materials.

The cathode may be prepared by mixing the particles according to at least one the above materials with one or more binders and other materials conventionally employed to prepare a cathode structure for an aqueous electrolyte system. These materials may be mixed as a slurry, coated onto a metal foil, and dried. The methods of construction of a cathode employing an active material are conventionally known and any such method that is compatible with the particles of the disclosure may be employed.

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylenic copolymer, a tetratluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper.

The cathode thus prepared may be employed in the construction of an aqueous lithium-ion battery in a conventionally known manner.

The zinc salt of an anion comprising a fluoroalkylsulfonyl group of formula (I) may be selected from the group consisting of Zinc (II) bis(trifluoromethylsulfonyl)imide (Zn$(TFSI)_2$), Zinc (II) bis(pentafluoromethylsulfonyl)imide (Zn$(BETI)_2$), Zinc (II) trifluoromethylsulfonate (Zn$(TFS)_2$, and Zinc (II) bis(fluoromethylsulfonyl)imide(Zn$(FSI)_2$).

The electrolyte may further contain a salt different from the zinc salt of an anion comprising a fluoroalkylsulfonyl group of formula (I). However, when one or more different salts from the zinc salt of an anion comprising a fluoroalkylsulfonyl group of formula (I) are included, a total mole content of the one or more different salts may have a molar ratio to total moles of electrolyte salt of less than ½. Further when one or more salts different the zinc salt of an anion comprising a fluoroalkylsulfonyl group of formula (I) are included a total concentration of the combined salts may be from 2M to 20 M, preferably from 3M to 15M and most preferably from 4M to 12M.

Examples of salts different from the zinc salt of an anion comprising a fluoroalkylsulfonyl group of formula (I) may include any water soluble zinc salt or a lithium salt such as lithium bis(trifluoromethyl-sulfonyl)imide (LiTFSI), lithium bis(pentafluoroethyl-sulfonyl)imide (LiBETI), lithium bis(fluoromethylsulfonyl)imide (LiFSI) and lithium trifluoromethylsulfonate (LiTFS).

Moreover, a molar ratio of the zinc salt of an anion comprising a fluoroalkylsulfonyl group of formula (I) or a molar ratio of the combined salts to water may be from 1/10 to 50/1, preferably from 1/1 to 40/1 and most preferable from 2/1 to 20/1.

The aqueous electrolyte may further contain an ionic liquid which is liquid at room temperature (20 to 25° C.). In one aspect the ionic liquid may be a salt of an organic cation and a bis(fluorosulfonyl) imide anion (FSI). The organic cation may be selected from the group consisting of an alkyl-ammonium cation, an alkylpiperidinium cation, an alkylpyrrolidinium cation, an alkylimidazolium cation and an alkylphosphonium cation. The term alkyl may be defined as a linear, branched, cyclic or alicyclic hydrocarbon group having 1 to 18 carbon atoms, preferably 1-12 carbon atoms and most preferably 1-6 carbon atoms. One of ordinary skill recognizes that when the molecular weight of the ionic liquid is increased to a structurally defined value the ionic compound is no longer liquid at room temperature.

The anode may be constructed of any suitable material capable of intercalation and deintercalation of zinc ion and may be zinc metal such as zinc foil, an alloy of zinc or a current collector upon which zinc may be deposited from electrolyte salt during a charging cycle of the battery.

Methods to prepare zinc electrodes (anodes) are conventionally known and any suitable method known to one of skill in the art may be employed.

In one aspect the anode component nay be a current collector such as, for example, a mat structure of stainless steel, aluminum or carbon fiber. Such mat structure offers a high surface area for zinc deposit and release and may enhance the rapid deposit rate described above and shown in FIG. 2A.

Figure 4:
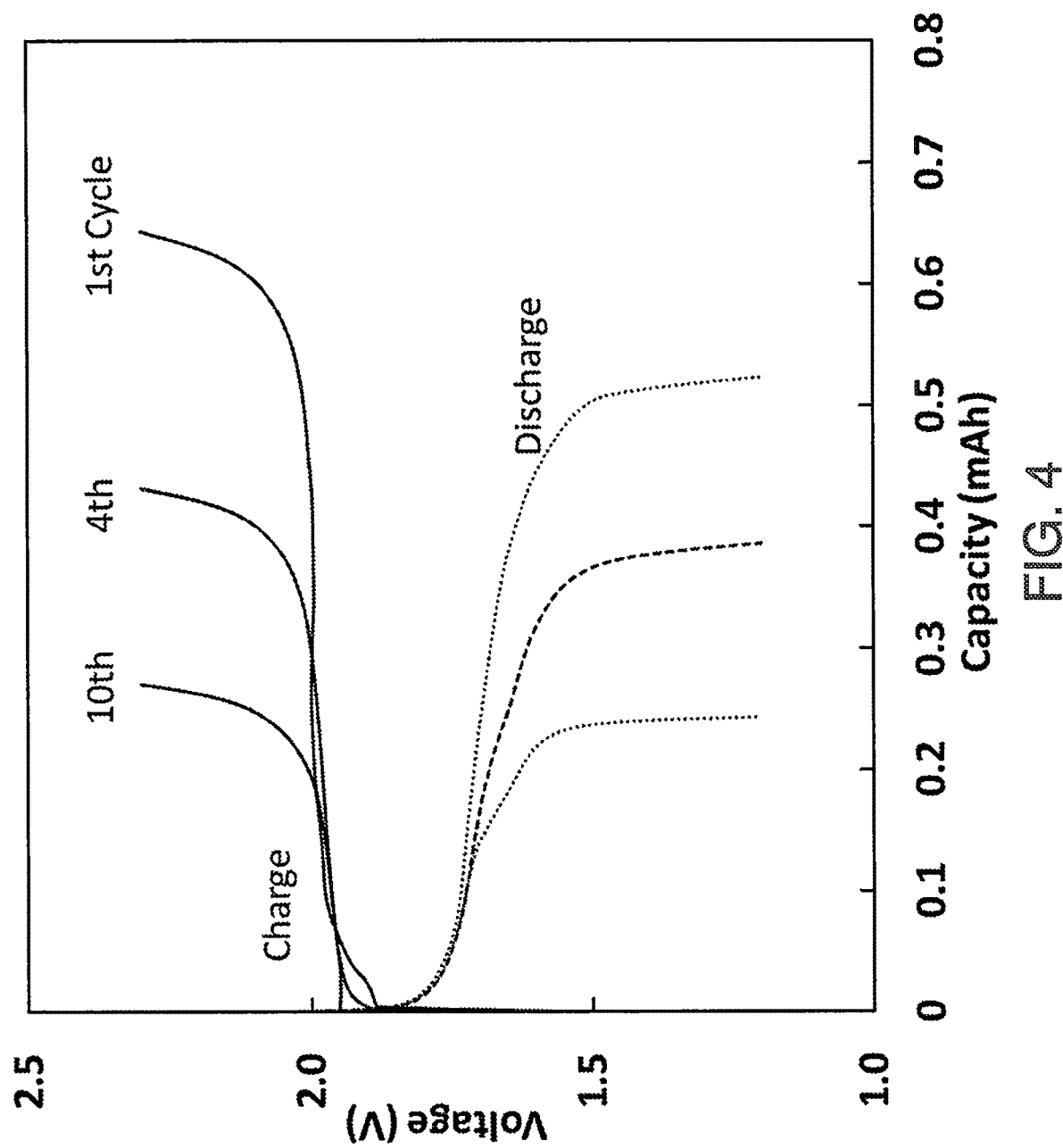
FIG. 4 shows the Charge/discharge curves ($1^{st}$ $4^{th}$ and the $10^{th}$ cycles) of a battery (LMO as cathode) at the current density of 6 mA/cm$^2$ with the electrolyte of Example 1.
Figure 5:
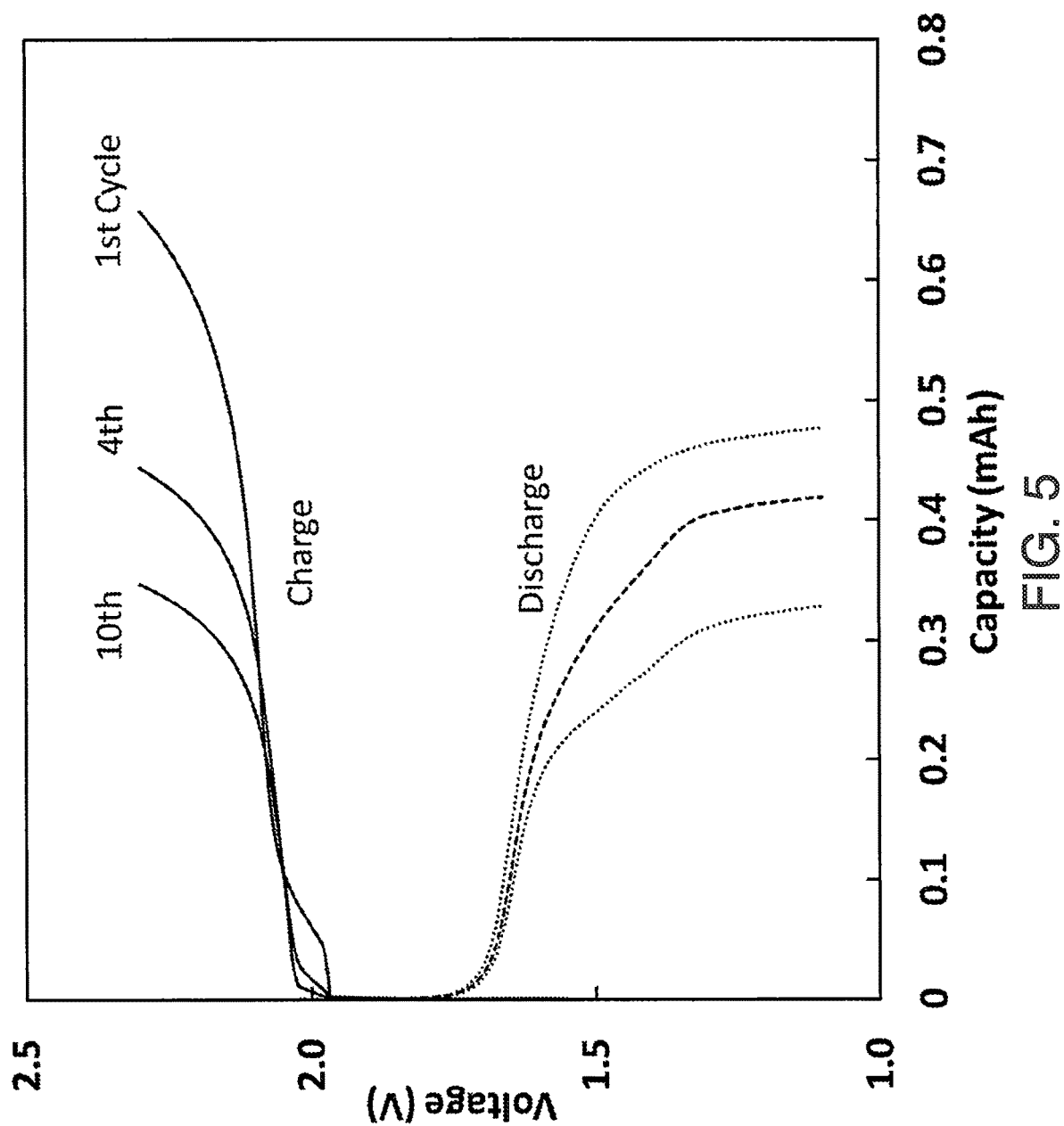
FIG. 5 shows the Charge/discharge curves ($1^{st}$, $4^{th}$ and the $10^{th}$ cycles) of a battery (LMO as cathode) at the current density of 20 mA/cm$^2$ the electrolyte of Example 1.

In one aspect the battery may be a single-compartment cell battery comprising one liquid electrolyte wherein no physical barrier separates the cathode electrolyte from the anode electrolyte. Such structure is schematically shown in FIG. 1. In such structure the zinc ions released at the anode during discharge may travel to the cathode. An example of such a battery is described in the Example section of this application and the Charge-discharge curves at the current density of 3 mA/cm$^2$, 6 mA/cm$^2$ and 20 mA/cm$^2$ for an electrolyte of Zn$(TFSI)_2$/Water in a 1:10 molar ratio are shown in FIGS. 4 and 5 respectively. These curves demonstrate that the battery is capable of performance with high discharge voltage over 1.6 V with stable cycling.

In another aspect the zinc ion hybrid battery may be a two-compartment cell battery, comprising: an anode compartment comprising an anolyte, a cathode compartment comprising a catholyte; and a solid electrolyte permeable to lithium ions separating the anode and cathode compartments, wherein the solid electrolyte prevents the crossover of the anolyte and the catholyte between the two compartments.

Figure 6:
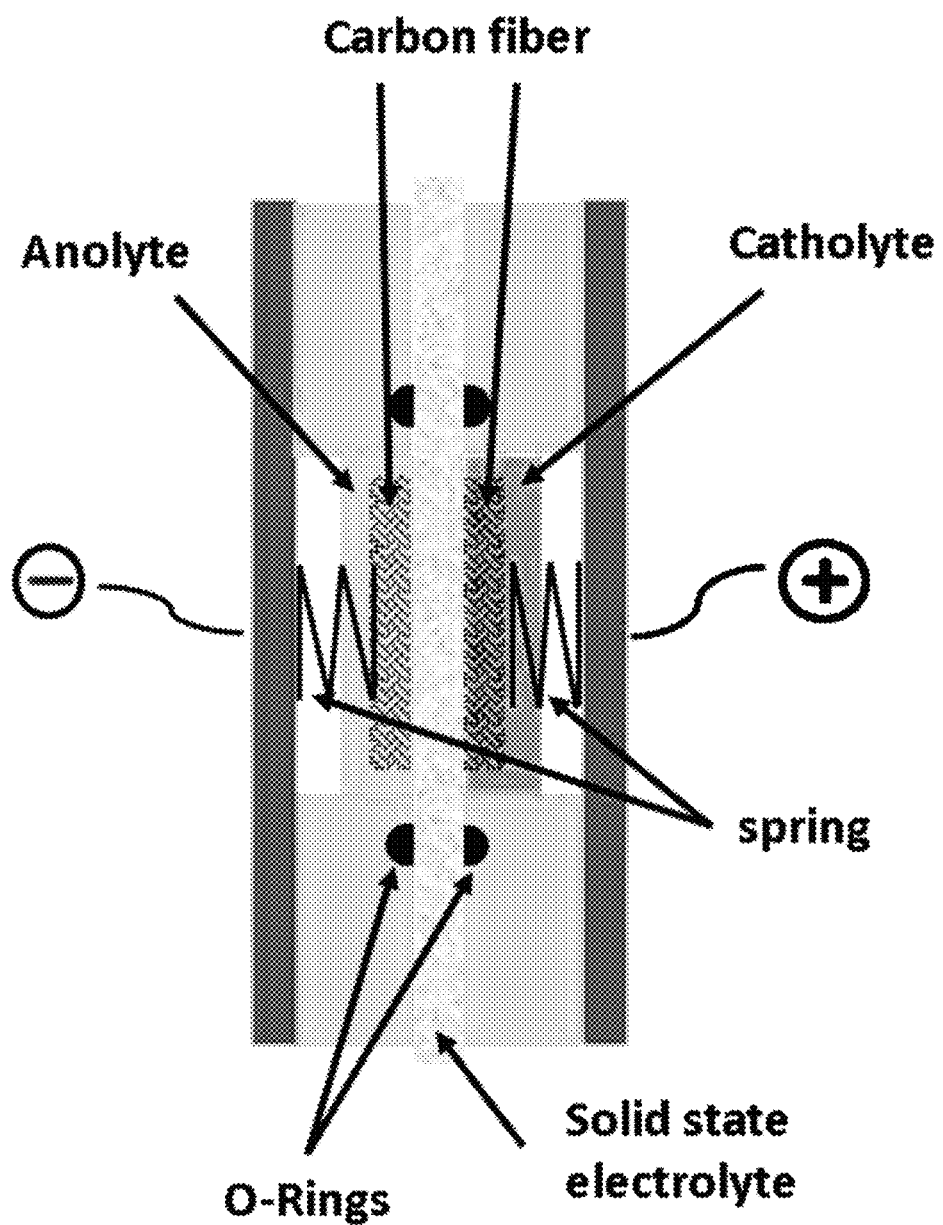
FIG. 6 shows a schematic diagram of a two-compartment cell battery configuration of a Zn—Li hybrid battery according to one aspect of the embodiment.
Figure 7:
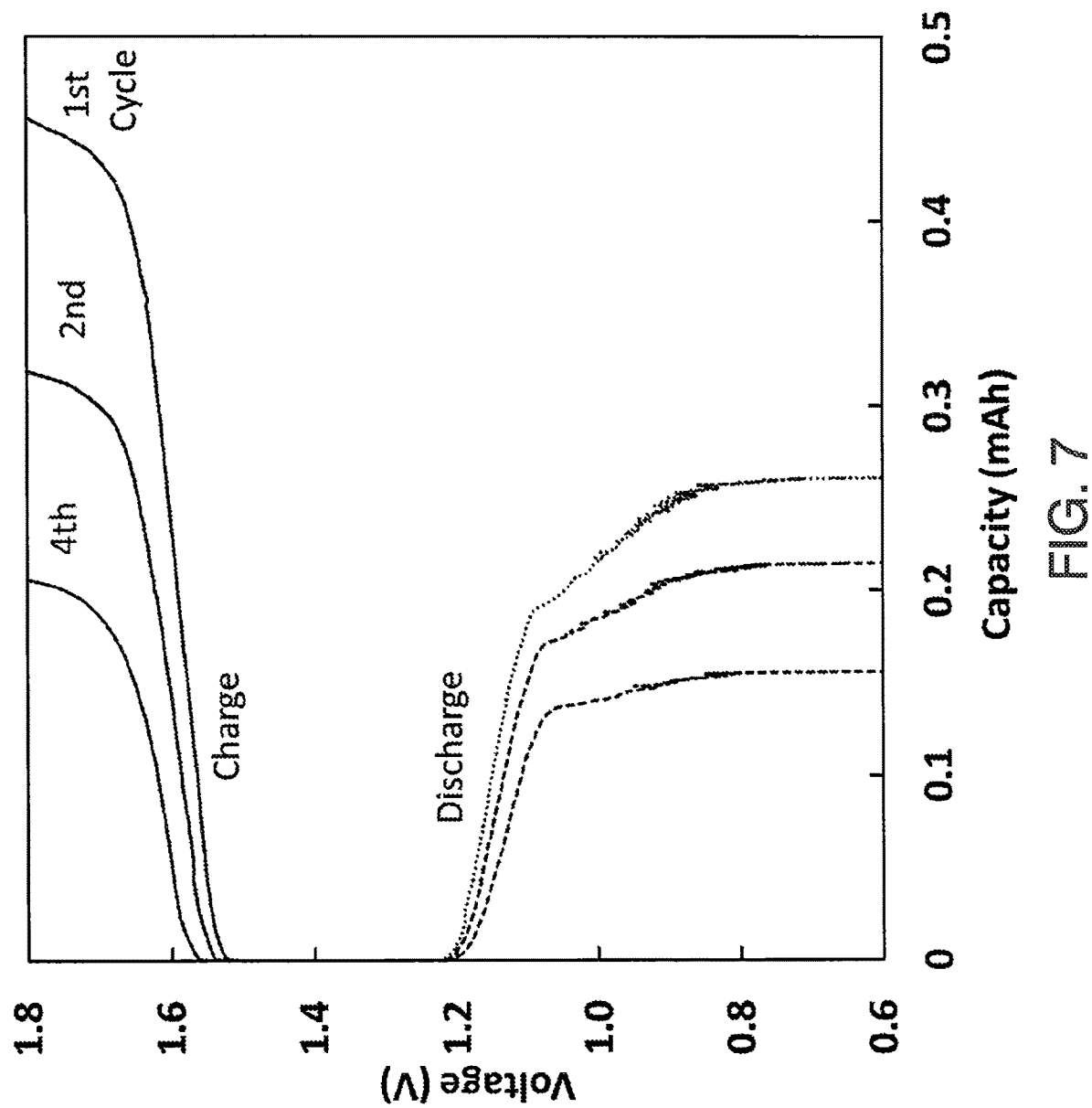
FIG. 7 shows the Charge/discharge curves ($1^{st}$, $2^{nd}$ and $4^{th}$ cycles) of a two-compartment cell battery configuration of a Zn—Li hybrid battery according to one aspect of the embodiment by using MeO-TEMPO catholyte with the electrolyte of Example 1 as anolyte.

An example of a two compartment battery is shown in FIG. 6 and FIG. 7 shows the Charge-discharge curves of the 1$^{st}$, 2$^{nd}$ and the 4$^{th}$ cycles of a liquid battery by using MeO-TEMPO catholyte with the electrolyte of Example 1 as anolyte. This figure shows clear evidence that the battery could perform at the all liquid battery configurations.

The solid electrolyte separator is permeable only to lithium ions and may be any such solid separator as conventionally known.

The anolyte compartment contains an aqueous electrolyte based on zinc salts as described above, while the catholyte compartment comprises the corresponding lithium salts of the anion comprising a fluoroalkylsulfonyl group of formula (I) in the molar content and molar ratios described above for the zinc salt.

The battery may be enclosed in a container and multiple units may be combined to form a battery as is conventionally known.

In further embodiments the present disclosure includes a vehicle containing the battery-according to the present disclosure wherein the vehicle includes an automobile, truck van, bus, golf cart and other utility forms of transportation.

Having generally described this disclosure, a further understanding can be obtained by reference to certain specific examples which are provided herein for purposes of illustration only and are not intended to be limiting unless otherwise specified.

EXAMPLES

Single-Compartment Cell Battery:
A one compartment 2031-type coin cell battery was constructed of the following components:
Cathode; LiMn$_2$O$_4$(LMO)/conductive carbon/PVdF binder
Separator: Glass fiber separator.
Anode current collector carbon fiber mat
Example electrolyte 1 Zn(TFSI)$_2$/Water 1:10 molar ratio
Example electrolyte 2 Zn(TFSI)$_2$/Water 1:20 molar ratio
In this cell configuration, only one liquid electrolyte is used in the battery and no physical barriers divide the electrolytes.

The constructed cell was subjected to a Charge/discharge evaluation as follows:
Charge 3-20 mA/cm$^2$(2.3 V cut-off)
Discharge 3-20 mA/cm$^2$(1.1-1.3 V cut-off)
Evaluation temp.: 25° C.

Figure 2A:
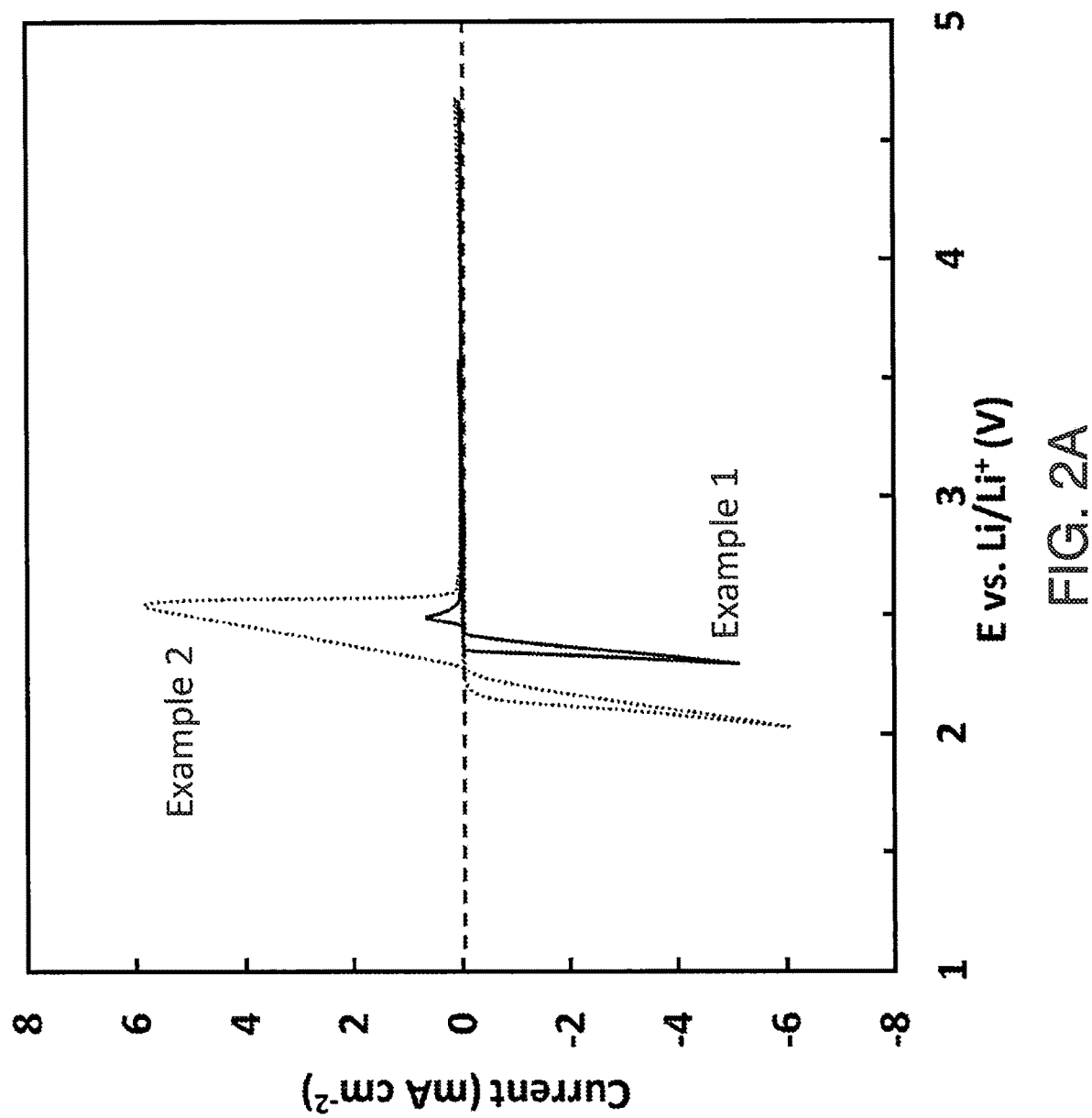
FIG. 2A shows the cyclic voltammetry results on electrolyte examples 1 and 2.
Figure 2B:
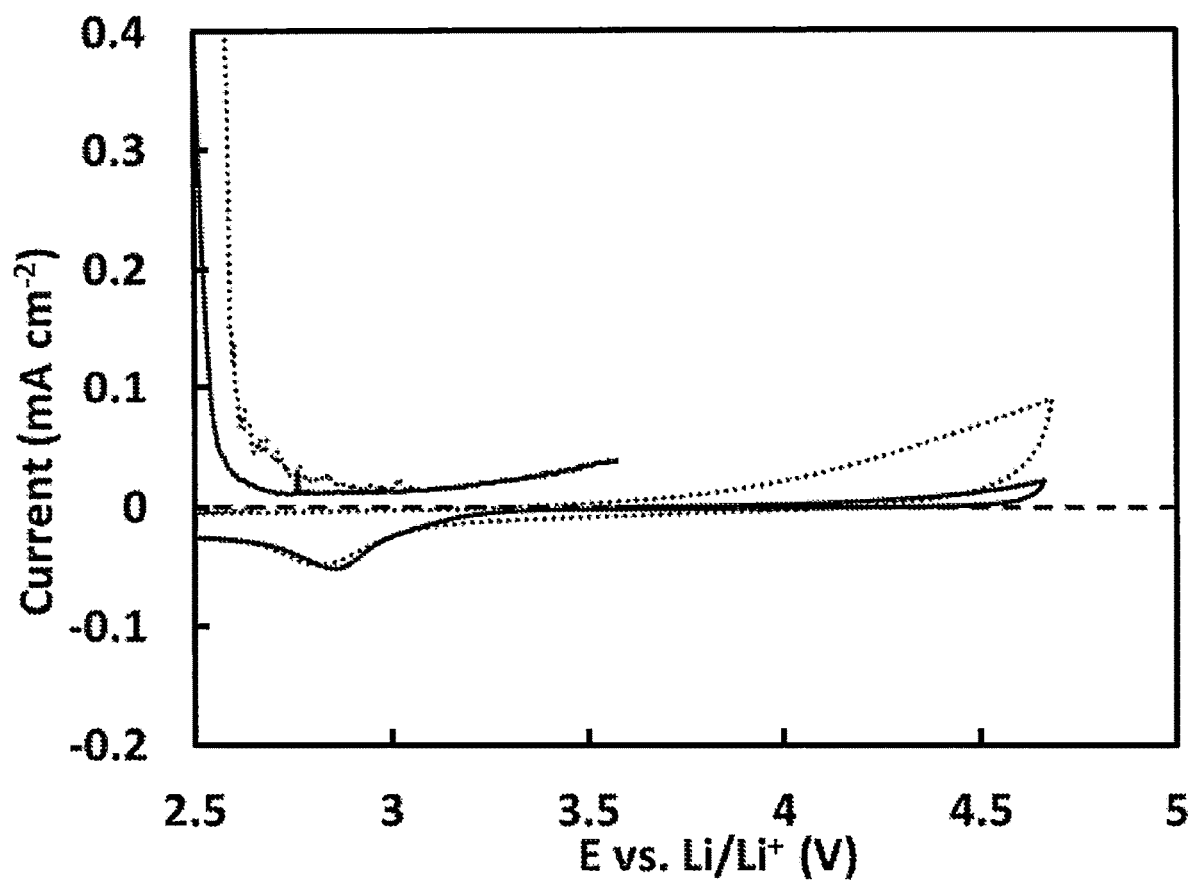
FIG. 2B shows the cyclic voltammetry results on electrolyte examples 1 and 2 at lower current value.

FIGS. 2A and 2B show the cyclic voltammetry testing results of electrolyte example 1 and 2.

Figure 3:
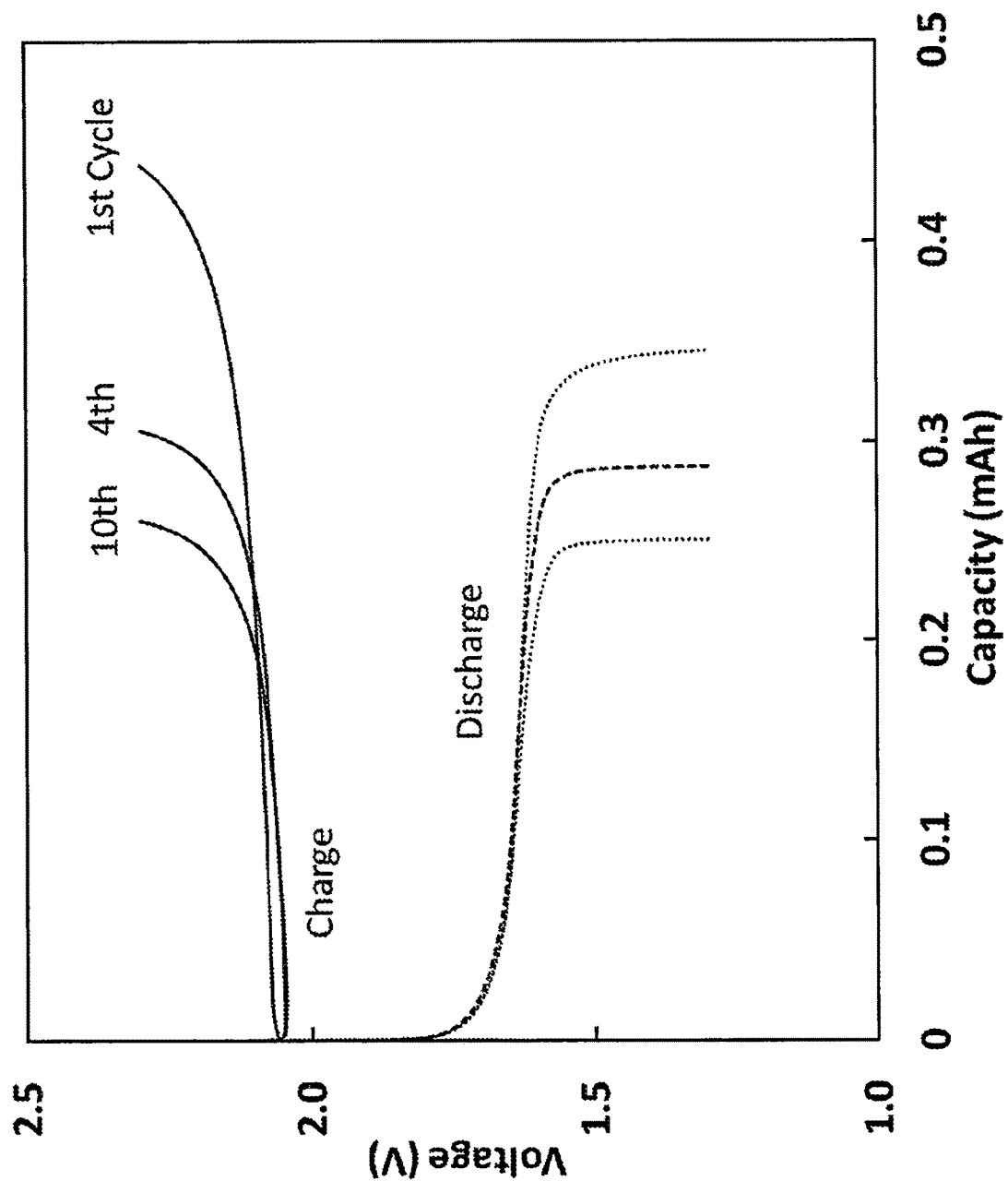
FIG. 3 shows the Charge/discharge curves ($1^{st}$ $4^{th}$ and the $10^{th}$ cycles) of a battery (LMO as cathode) at the current density of 3 mA/cm$^2$ with the electrolyte of Example 1.

FIG. 3 shows the Charge/discharge curves for the 1$^{st}$, 4$^{th}$ and the 10$^{th}$ cycles of the single compartment battery at the current density of 3 mA/cm$^2$ with Example electrolyte 1. This figure shows clear evidence that the battery could perform high discharge voltage over 1.6 V with stable cycling.

FIG. 4 shows the Charge/discharge curvet of the 1$^{st}$, 4$^{th}$ and the 10$^{th}$ cycles of the single compartment battery at the current density of 6 mA/cm$^2$ with Example electrolyte 1. This figure shows clear evidence that the battery could perform high discharge voltage over 1.6 V with stable cycling.

FIG. 5 shows the Charge/discharge curves the 1$^{st}$, 4$^{th}$ and the 10$^{th}$ cycles of the single compartment battery at the current density of 20 mA/cm$^2$ with Example electrolyte 1. This figure shows clear evidence that the battery could perform high discharge voltage over 1.6 V with stable cycling at high current density and generate high power.

Two-Compartment Cell Battery:
A two compartment cell was prepared as shown in the schematic drawing of FIG. 6. In this cell configuration, two types of liquid electrolytes (catholyte and anolyte) are separated by a solid electrolyte, which prevents the crossover of the electrolytes. The components of the cell were as follows:
Catholyte MeO-TEMPO/LiTFSI/water=1:1:4 molar ratio
Separator: Glass-ceramic Li-conducting solid state electrolyte
Anolyte: Zn(TFSI)$_2$/Water FIG. 7 shows the Charge/discharge curves of the 1$^{st}$, 2$^{nd}$ and the 4$^{th}$ cycles of a liquid battery by using MeO-TEMPO catholyte with Example electrolyte 1 as anolyte. This figure shows clear evidence that the battery could perform at the all liquid battery configuration.

The above description is presented to enable a person skilled in the art to make and use the invention, and is provided in the context of a particular application and its requirements. Various modifications to the preferred embodiments will be readily apparent to those skilled in the art, and lite generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A single compartment zinc ion hybrid battery, comprising:
an anode that intercalates and de-intercalates zinc ions;
a cathode having a 4V active material that intercalates and de-intercalates zinc and lithium ions; and
an aqueous electrolyte which comprises:
water; and
a zinc salt having an anion comprising a fluoroalkylsulfonyl group of formula (I):

R—SO$_2$— (I)

wherein R is a perfluoroalkyl group of 1-5 carbons;
wherein the 4V cathode active material is stable to the aqueous electrolyte and comprises at least one material selected from the group consisting of LiMn$_2$O$_4$, LiCoO$_2$, LiFe$_2$(PO$_4$), LiMn$_{1/3}$Ni$_{1/3}$Co$_{1/3}$O$_2$, LiNi$_{0.5}$Mn$_{1.5}$O$_4$, LiCoPO$_4$, 2,2,6,6-tetra-methylpiperidine 1-oxyl (TEMPO) and 4-methoxy-2,2,6,6-tetramethylpiperidine 1-oxyl (MeO-TEMPO), and
wherein no physical barrier separates the aqueous electrolyte contacting the cathode from the aqueous electrolyte contacting the anode.

2. The zinc ion hybrid battery according to claim 1, wherein the zinc salt is selected from the group consisting of Zinc (II) bis(trifluoromethylsulfonyl)imide (Zn(TFSI)$_2$), Zinc (II) bis(pentafluoroethylsulfonyl)imide (Zn(BETI)$_2$), Zinc (II) trifluoromethylsulfonate (Zn(TFS)$_2$, and Zinc (II) bis(fluoromethylsulfonyl)imide (Zn(FSI)$_2$).

3. The zinc ion hybrid battery according to claim 1, wherein a molar ratio of the zinc salt comprising the fluoroslkylsulfonyl group of formula (I) to the water is from 1/10 to 50/1.

4. The zinc ion hybrid battery according to claim 1, wherein the electrolyte further comprises a water soluble zinc salt different from the zinc salt comprising the fluoroslkylsulfonyl group of formula (I).

5. The zinc ion hybrid battery according to claim 1, wherein the electrolyte further comprises a room temperature ionic liquid which is a salt of an organic cation and a bis(fluorosulfonyl) imide anion (FSI).

6. The zinc ion hybrid battery according to claim 1, wherein the anode is a carbon fiber mat.

7. A two-compartment zinc ion hybrid battery, comprising:
an anode compartment comprising an anode that intercalates and de-intercalates zinc ions and an anolyte which comprises:
water;
and
a zinc salt having an anion comprising a fluoroalkylsulfonyl group of formula (I):

$$R-SO_2- \qquad (I)$$

wherein R is a perfluoroalkyl group of 1-5 carbons;
a cathode compartment comprising a cathode having a 4V active material which can intercalate and de-intercalate zinc ions, lithium ions or both zinc and lithium ions; and
a catholyte comprising zinc ions and lithium ions; and
a solid electrolyte permeable to lithium ions;
wherein
the 4V cathode active material is stable to the catholyte and comprises at least one material selected from the group consisting of $LiMn_2O_4$, $LiCoO_2$, $LiFe_2(PO_4)$, $LiMn_{1/3}Ni_{1/3}Co_{1/3}O_2$, $LiNi_{0.5}Mn_{1.5}O_4$, $LiCoPO_4$, 2,2,6,6-tetra-methypiperidine 1-oxyl (TEMPO) and 4-methoxy-2,2,6,6-tetra-methypiperidine 1-oxyl (MeO-TEMPO), and
the solid electrolyte prevents the crossover of the anolyte and the catholyte.

8. The zinc ion hybrid battery according to claim 7, wherein the anode is a carbon fiber mat.

9. A vehicle comprising the zinc ion hybrid battery according to claim 1.

10. The two compartment zinc ion hybrid battery according to claim 7, wherein the zinc salt of the anolyte is selected from the group consisting of Zinc (II) bis(trifluoromethylsulfonyl)imide ($Zn(TFSI)_2$), Zinc (II) bis(pentafluoroethylsulfonyl)imide ($Zn(BETI)_2$), Zinc (II) trifluoromethylsulfonate ($Zn(TFS)_2$), and Zinc (II) bis(fluoromethylsulfonyl)imide ($Zn(FSI)_2$).

11. The two compartment zinc ion hybrid battery according to claim 7, wherein a molar ratio of the zinc salt to water in the anolyte is from 1/10 to 50/1.

12. The two compartment zinc ion hybrid battery according to claim 7, wherein the anolyte further comprises a water soluble zinc salt different from the zinc salt.

13. The zinc ion hybrid battery according to claim 7, wherein the anolyte, catholyte or the anolyte and the catholyte further comprises a room, temperature ionic liquid which is a salt of an organic cation and a bis(fluorosulfonyl) imide anion (FSI).

14. A vehicle comprising the two compartment zinc ion hybrid battery according to claim 7.

* * * * *

UNITED STATES PATENT AND TRADEMARK OFFICE
CERTIFICATE OF CORRECTION

| | | |
|---|---|---|
| PATENT NO. | : 10,763,543 B2 | Page 1 of 1 |
| APPLICATION NO. | : 15/949275 | |
| DATED | : September 1, 2020 | |
| INVENTOR(S) | : Ruidong Yang et al. | |

It is certified that error appears in the above-identified patent and that said Letters Patent is hereby corrected as shown below:

On the Title Page

Item (54) and in the Specification, Column 1, Line 1, "RECHARGEABLE AQUEOUS HYBRID BATTERY" should read -- RECHARGEABLE AQUEOUS ZINC HYBRID BATTERY --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*